United States Patent [19]

Burk

[11] Patent Number: 5,083,867
[45] Date of Patent: Jan. 28, 1992

[54] SLAB SURFACE CONTOUR MONITOR

[75] Inventor: David L. Burk, Pittsburgh, Pa.

[73] Assignee: Allegheny Ludlum Corporation, Pittsburgh, Pa.

[21] Appl. No.: 276,717

[22] Filed: Nov. 28, 1988

[51] Int. Cl.⁵ ..................... G01B 11/24; G01N 21/86
[52] U.S. Cl. .................................. 356/376; 356/384; 356/385; 250/560
[58] Field of Search ............... 356/376, 237, 340, 377, 356/384, 385; 250/560, 561, 222.1, 223 R

[56] References Cited

U.S. PATENT DOCUMENTS

| | | | |
|---|---|---|---|
| 3,187,185 | 6/1965 | Milnes | 356/381 |
| 3,858,983 | 1/1975 | Foster et al. | 356/163 |
| 4,105,925 | 8/1978 | Rossol et al. | 356/376 |
| 4,118,544 | 2/1980 | Chasson | 250/560 |
| 4,158,507 | 6/1979 | Himmel | 356/376 |
| 4,223,346 | 9/1980 | Neiheisel | 356/430 |
| 4,238,147 | 12/1980 | Stern | 354/77 |
| 4,498,778 | 2/1985 | White | 356/376 |
| 4,541,722 | 9/1985 | Jenks | 356/376 |
| 4,594,001 | 6/1986 | DiMatteo et al. | 356/376 |
| 4,650,333 | 3/1987 | Crabb et al. | 356/376 |
| 4,679,076 | 7/1987 | Vikterlof et al. | 356/376 |
| 4,702,605 | 10/1987 | Stern et al. | 356/376 |
| 4,741,621 | 5/1988 | Taft et al. | 356/376 |
| 4,801,207 | 1/1989 | Williams | 356/376 |
| 4,839,994 | 6/1989 | Heesemann | 356/376 |

OTHER PUBLICATIONS

Publication-"Development of Shape Meter for Hot Strip Rolling", Kenighimatsui and Hidefumitachibana, 111th ISIJ Meeting Apr. 1986.
"The White Scanner 100 Series," Technical Arts Corp., Seattle, Wash., Revision #1, Apr. 1983.

Primary Examiner—Richard A. Rosenberger
Assistant Examiner—Hoa Pham
Attorney, Agent, or Firm—Patrick J. Viccaro

[57] ABSTRACT

A system for creating a image of the surface contours of a metal workpiece, such as a continuous cast slab, is provided including a sheet of single frequency, planar light is directed to strike a surface of the workpiece, and a video camera positioned to view the surface where the light strikes, such that when the surface of the workpiece is flat, a straight line is sensed by the video camera, when the surface is irregular, the video camera senses a nonlinear line, the video camera creates a two dimensional image of the sensed light and supplies this signal to a processor, which then creates an image of the workpieces which is displayed by a video monitor and a printer. The processor extracts a variety of quantitative parameter values from the images.

29 Claims, 3 Drawing Sheets

SLAB HEAT SURFACE REPORT

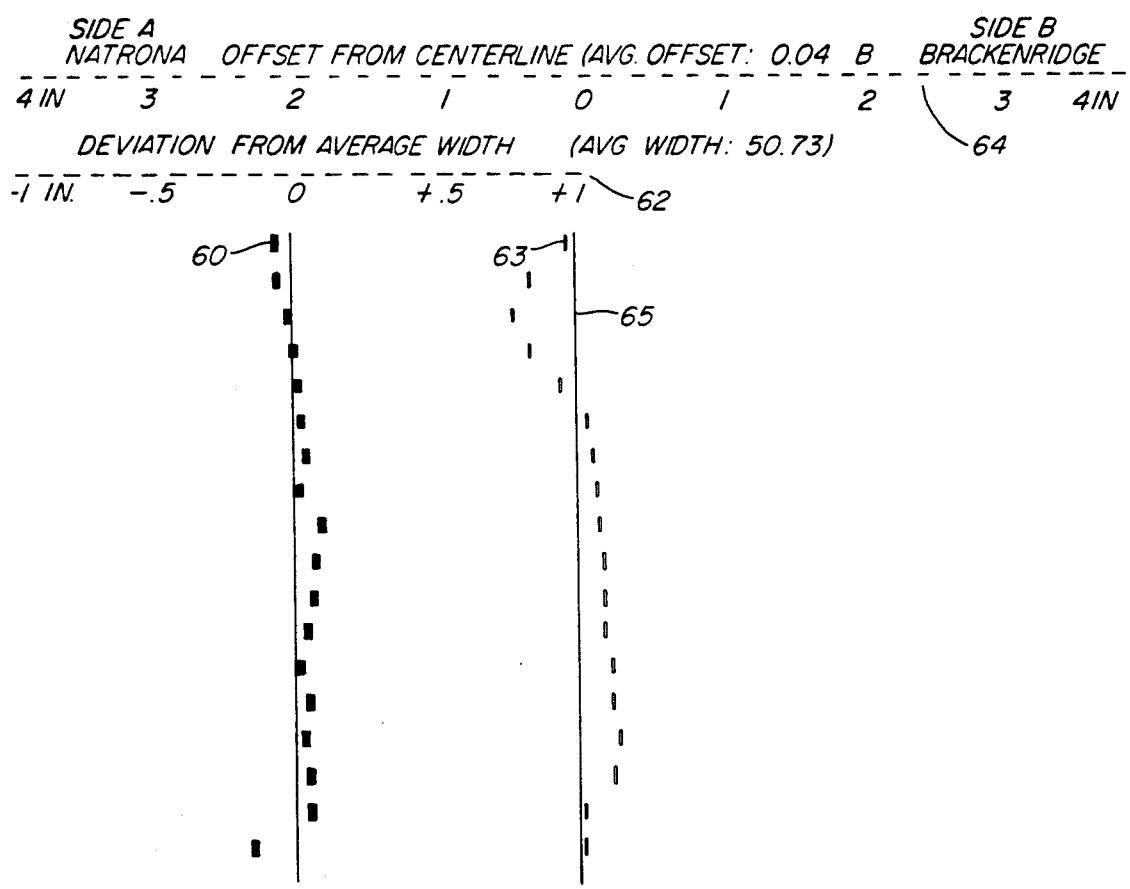

SLAB SURFACE CONTOUR MONITOR

BACKGROUND OF THE INVENTION

1. Field of the Invention

The present invention relates generally to a non-contact monitoring of a surface contour of a workpiece, and more particularly, to a system for monitoring, recording and/or controlling parameters affecting the surface contour of a metallic workpiece, such as a continuous cast slab.

2. Description of the Prior Art

In the production of metal workpieces by continuous casting techniques, molten metal is supplied to the continuous caster which forms the configuration of the metal slab. In the particular instance in which slabs are formed by the continuous caster, the desired product is one in which the surfaces thereof are of uniform flatness. When a slab is formed having surfaces which are of this ideal flatness, additional processing is not required in order to flatten the surfaces. However, when the surfaces of the slab are not uniformly flat, a remedial process can be required in order to flatten the surfaces of the slab. Such a process requires grinding of the surfaces in order to reduce protruding surfaces. This additional step not only requires additional time and expense, but also results in the loss of a certain amount of the product which becomes scrap.

As a result, attempts are made to ensure that the cast product is as flat as possible. Because the temperature of the slab, or other metal workpiece, as it emerges from a continuous caster can have areas in excess of 1500 degrees Fahrenheit (8 16 degrees Centigrade), and because the workpiece is typically moving at a rate of between 32 and 45 inches per minute (81 and 114 cm/min), the unaided visual appearance often does not reveal the distortion, and accurate measurement of the surface contours of the workpiece is quite difficult. A real time, on-line display and measurement of the surface contours of the workpiece as it emerges from the continuous casting machine would be beneficial in order to alter control parameters of the machine operations to minimize surface deformities. Permanent capture of the data would provide documentation for off-line study and correlation with other operating data.

Present procedures for quantitatively determining the surface flatness of a workpiece requires the metal to be cut and a cross-section of the metal to be removed to allow measurement of the surface at a remote location. This is a time consuming and expensive procedure, and cannot be performed during on-line production of the workpiece. A simpler, albeit qualitative, measurement of the surface contours of the workpiece is more frequently performed. This involves a procedure in which plant personnel occasionally place a straight edge across a surface of a workpiece and then estimate the surface geometry of the workpiece. From this qualitative evaluation then, control and alignment parameters of the continuous caster may be altered in order to produce a workpiece of greater flatness.

A system which makes slab distortion visible and which accurately and quantitatively measures the surface contours of a metal workpiece as the workpiece emerges from the continuous caster would greatly facilitate efforts to evolve caster practices to consistently produce workpieces of maximum quality with assurance such quality can be maintained through early alert to the occurrence of deviation.

U.S. Pat. No. 4,741,621 discloses a surface inspection system for a geometric surface to detect cracks and imperfections in a combustion chamber, such as a steam boiler. A reference surface curve is compared with an actual surface curve to detect surface flaws. Laser light is split into separate beams, and each beam is incident upon the wall at a different angle to prevent shadows due to surface imperfections. The system is used to detect small, hairline cracks in a surface. U.S. Pat. No. 4,188,544 discloses a system for maximizing the amount of salable wood products from logs, particularly how to optimize subdividing of the wood log at a lumber mill. A planar light source from a laser is projected at a first angle. The intersection line on the log is detected at a second angle to generate signals related to the dispersions of the workpiece. These signals are compared and modified by second known reference signals. The modified signals are converted to processing control signals for sawing the workpiece.

It is therefore the object of the present invention to provide a system to display and quantitatively determine the surface contours of a metal workpiece.

It is a further object of the present invention to provide a system which creates a quantifiable image of the surface contours of a metal workpiece to allow real-time control of caster parameters to create workpieces of maximum quality. Preferably, the system is a non-contacting device with no moving parts which can survive in the environment about a continuous caster.

SUMMARY OF THE PRESENT INVENTION

In accordance with the present invention, there is provided a method and system for creating an image of a surface of a metallic workpiece, such as a continuous cast slab, in which the system includes monochromatic planar light emitting means for directing a thin sheet of light at an acute angle upon a surface of the workpiece and image creating means for creating an image of the light which reflects from the surface of the workpiece. The output signal is used to produce data corresponding to the contour of the illuminated surface of the slab. In the preferred embodiment of the present invention, the light emitting means is comprised of a laser and a lens means which emits monofrequency sheet of light directed at an acute angle upon the surface of the workpiece. The image creating means, preferably, is comprised of a video camera positioned to receive the laser light reflected from the surface of the workpiece.

An image capture, processing and recording means is coupled to the image creating means for handling the images generated by the image creating means. In the preferred embodiment, the image handling means includes a digital computer containing a camera multiplexer, a frame grabber and a memory means for storing images. The imaging handling is done by an algorithm residing in the computer. A computer monitor means may further be included for displaying the processed images of the surface workpiece. Preferably a printer is included as part of the system to provide a hard copy of the slab contour images and information derived therefrom. The printed images may be scaled so that direct 1:1 measurement of the distortion can be made on the printed images.

In one embodiment of the present invention, the system may be utilized to create an image of a cross-section of a continuous cast slab as the slab emerges from a continuous caster. In this embodiment, lasers are positioned to direct a line of light upon opposite edge surfaces of the slab as well as the top and bottom surfaces of the slab. Video cameras positioned to receive light reflected from the slab surfaces generate signals indicative of locations of the laser line on the surfaces of the workpiece from which the light is reflected. A digital computer receives these signals and creates an image of a cross-section of the slab. Other parameters such as center-line offset and slab width are also obtainable from the information.

BRIEF DESCRIPTION OF THE DRAWINGS

The present invention may be better understood when the following description is read in light of the accompanying drawings in which:

FIG. 5 is another print-out from the system of the present invention illustrating statistics and plots of slab width and slab center-line offset for the entire cast slab as derived from data as illustrated in FIG. 4.

DESCRIPTION OF THE PREFERRED EMBODIMENT

While the system of the present invention may be utilized to create an image of a surface contour of a hot or cold metallic workpiece, it is particularly adapted for continuous slab casting.

Figure 1:
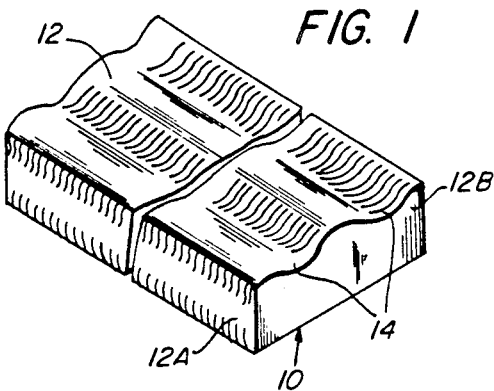
FIG. 1 is a perspective view of a portion of a continuous cast slab formed by a continuous caster showing depressions in the top surface known as gutters.

Referring first to the illustration of FIG. 1, there is shown a cut-away view of a portion of a continuous cast slab 10 formed by a continuous caster. Top surface 12 of slab 10 contains guttered areas 14 which are exaggerated for purposes of illustration. Depending on the gutter depth and the grade of metal comprising the slab, elevated or protruding surface portions of the slab must be removed prior to subsequent processing of the slab. Such surface removal is most frequently accomplished by means of grinding operations. Surface contours of the edge surfaces 12A and 12B of the slab 10 may similarly contain non-uniform surface areas which also may undergo grinding operations prior to further processing of the slab. By casting a slab 10 which has uniformly flat surfaces, no remedial processing to produce flatness is required prior to hot rolling or other conventional processing of the slab, and, therefore, no excess loss of metal due to surface removal results.

As described hereinabove, control and alignment parameters of the continuous caster which casts the slab 10 may be altered to minimize the extent of such guttering. However, because existing means for measuring the surface contours of the slab 10 are either infrequent because of the heat and qualitative in nature, or, alternatively, not performed on-line, the relationship between alterations to the parameters controlling the continuous caster and the resultant cast product can not be readily determined.

The present invention provides a means of making the slab surface and edge distortion continuously, visually apparent. The present invention provides a system which periodically captures a real time image of the surface contours of a metal workpiece such as a slab. When positioned to measure the surface contours of a workpiece as the workpiece emerges from a continuous caster, the system of the present invention thereby allows plant personnel to ascertain the effects of alterations made upon the casting and alignment parameters controlling operation of a continuous caster.

Figure 2:
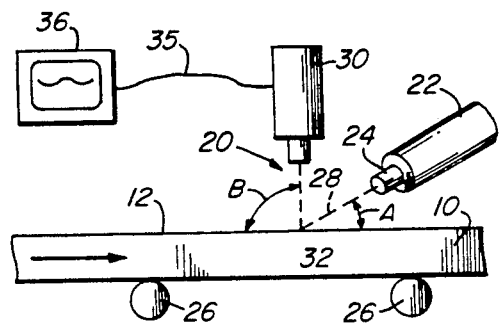
FIG. 2 is a schematic diagram of the contour image creating unit positioned above the top surface of a slab on a slab run-out table.

Referring now to FIG. 2, there is shown an embodiment of the imaging system 20 which includes a laser 22 having a lens 24 constructed and arranged to direct a sheet-like form of a monofrequent light beam toward the slab 10 emerging on rollers of a run-out table 26 from a continuous caster. The path of a light emitted by the laser is shown by broken lines and identified by reference numeral 28. The laser beam 28, is directed at an acute angle of attack A to obtain a geometrical magnification of the distortion. In the embodiment described here an angle A of about 26 degrees was chosen which gives a magnification of about a factor of 2. A series of lasers 22 can, when desired, be positioned to direct sequentially arranged and aligned sheets of monofrequency light at an acute angle across the top surface of slab 10. Angle A can be an acute angle but not a right angle. Although for purposes of illustration, only one laser is pictured in the illustration of FIG. 2, the preferred embodiment of the present invention utilizes at least two lasers, positioned to direct light upon the top surface 12 of slab 10. Additional lasers are arranged for directing light upon each of the opposite side edges of slab 10. By appropriate selection of the lens 24 in front of the lasers, a broad, planar, single frequency light sheet may be directed upon the surfaces of the slab 10. Because of the high temperature of the cast slab 10, the lasers are housed in water-cooled jackets to allow positioning of the lasers close to the respective slab surfaces. The path of light emitted by the laser is shown by broken lines in FIG. 2.

Video camera 30 of imaging system 20 is mounted at a position so as to enable viewing of the laser light which is the intersection 32 of the projected sheet of light and the slab surface 10. The video camera 30 must be positioned and appropriate lenses chosen so that the surface of the slab where the laser light strikes is within the camera's viewing range. Video camera 30 is positioned at angle B to view the surface of slab 10 where the laser light strikes. The surface angle B can vary plus or minus from 90 degrees, but an angle of 90 degrees simplifies the system.

In the event that the surface of the slab 10 is uniformly flat, the intersection of the sheet of light 32 with the slab surface occurs along a straight line. If the surface of slab 10 is irregular then, because the angle A is acute, the planar light wave strikes the surface closer to the laser at the high areas of the surface and further from the laser in the low areas of the slab surface. The line of light along the impingment site 32 is, thus, non-linear. Camera 30 is located to view at angle B, an attack angle which must be different from angle A, the laser attack angle. The video cameras CCD arrays are preferred.

The video camera 30 detects the line of light impingment with the slab surface and produces a two dimensional image thereof. By positioning an appropriate filter in front of the lens of camera 30, only light of the same frequency as that generated by laser 22 is detected by the camera. With the use of a filter, a high contrast image assures a video image of the line and avoids problems resulting from other light sources, such as ambient light and infrared radiation from the slab hot itself. Because of the high temperature of the cast slab 10, the lasers and cameras which are in close physical proximity to the hot slab should be housed in water cooled jackets in this embodiment.

On narrow slabs a single laser and camera imaging unit 20 may give a field of view wide enough to cover the entire width. For wider slabs imaging unit 20 is duplicated and aligned across the width so that full coverage is obtained. In the present embodiment two system 20 units are used. For clarity only one is shown. The implementation to image the bottom surface (not shown) would also consist of two imaging units 20 in this specific embodiment.

Figure 3:
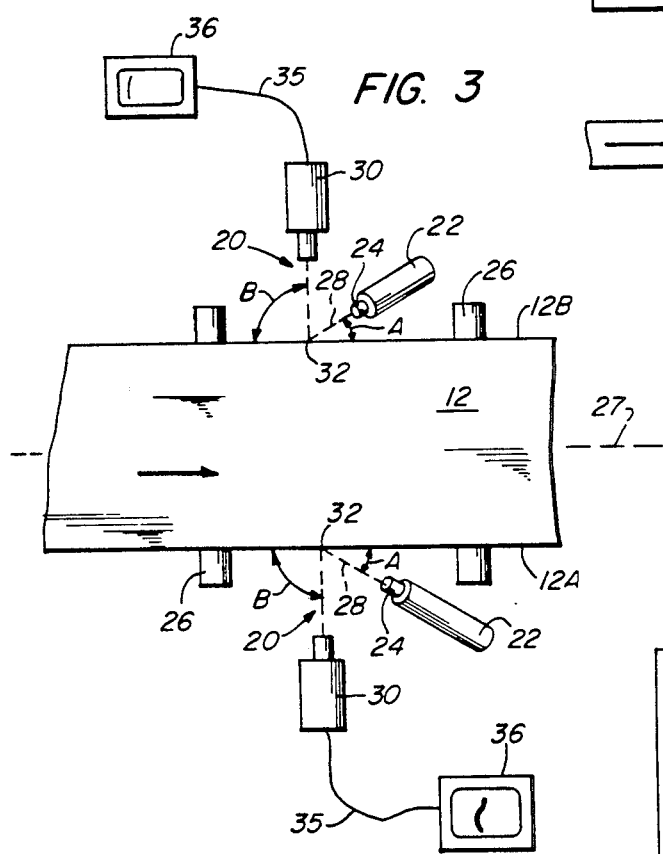
FIG. 3 is a schematic illustration of contour image creating unit positioned at opposite sides of a slab run-out table.

Referring now to the schematic illustration of FIG. 3, there is shown a preferred embodiment of the present invention where the configuration of the laser and camera of imaging unit 20 is duplicated and aligned to image the surface contour of the edges of the slab. Because the slab is only a few inches thick, in the case of this specific embodiment 8¼ inch (21 cm), only one unit 20 is required from each edge. In the case of the edge imaging unit 20 the laser line will position itself toward the laser for wide slabs and away from the laser for narrow slabs. The field of view of the edge camera 30 must be arranged so that this entire range is adequately covered. For example, slabs cast may have widths which can be set at any value from about 34 inches (86 cm) to 54 inches (137 cm), a difference of 20 inches (51 cm). A camera field covering about 24 inches is adequate to cover this width range while allowing for some offset of the slab transverse to the run-out table 26. Although each camera only sees half of the width change on its edge, the image shifts twice that amount because of the choice of preferred angle A at 26 degrees. One reason to choose the attack angle of 26 degrees is to give the edge image enhanced sensitivity to width. Two very important continuous caster parameters are the width produced and the offset. The latter is a measure of the transverse shift of the slab with respect to the centerline 27 of run out table 26, as the cast emerges from the machine. Slab width and offset can be determined by combining the information of the position of the line and the image from each edge camera. In the configuration being described for purposes of revealing the invention, the limit of resolution is about 1/32 inch (0.794 mm).

For diagnostic and alignment convenience the present embodiment of the invention has a video monitor 36 dedicated to each video camera 30. Standard video coaxial cable 35 routes each video signal to the image handling means.

It is understood that machinery interferences on any particular caster may require variations from angles A and B within the imaging units 20 and that the locations of the units may have to vary somewhat and still be within the invention described herein. In this specific embodiment there was a walk-way through the run-out table 26 which could be utilized so that the intersection of the lines on the wide surfaces could be located in the middle of the field of view of the edge units and the edge units could be opposite each other. The result of this is that the images from individual imaging units 20 will all closely refer to the same location along the slab. The algorithm in the image handling means to be described next can be adjusted to accommodate some of the modifications due to equipment interferences when the images are not referring to the same location at the same time.

Figure 3A:
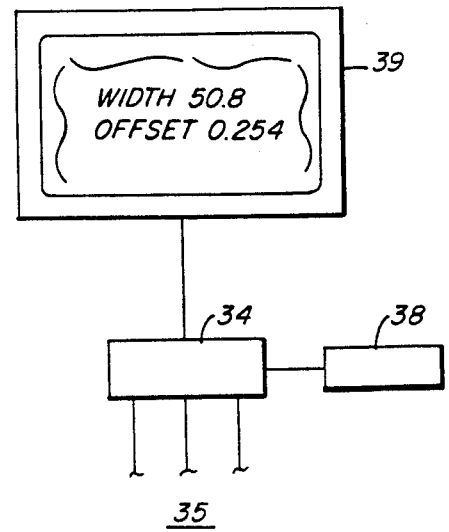
FIG. 3A is a block diagram of the image handling means into which the individual camera signals are routed and from which the display and quantifiable images emerge.

Referring now to FIG. 3A, image handling means 34 has input cables 35 coming from each of the video cameras 30. Handling means 34 may, for example be comprised an International Business Machines Corporation Computer (IBM), Model AT, or the like. The internal hardware of the handling means 34 includes the usual RAM memory, floppy and hard disk memory storage and it also, in this embodiment, includes a tape device for archive storage of the data for back-up and off-line review on another computer. Handling means 34 also includes a vision interface multiplexing frame grabber board or equivalent.

An appropriate algorithm utilized by handling means 34 allows the capture of an image of any of the surfaces, or a combination thereof, to form a processed image of any of the surfaces, or a combination thereof, to form a processed image of the cross-section. This allows a display on a computer monitor 39 to allow observation by operating personnel. A printer 38 is also connected to the handling means 34 to produce a hard copy of the processed image of the slab surface. As will be more fully discussed hereinafter, the algorithm of the handling means 34 may utilize the data to measure width and offset, form averages, standard deviations, plots, statistics, etc., some of which can be displayed on the computer monitor 39 as each frame is grabbed and can be presented on hard copy from printer 38 after the entire cast is completed.

When a suitable algorithm is installed an image of the cross-section of the slab may be created every few seconds. Hereinafter the rapid capture of images sequentially from all imaging units 20 will be referred to as a "frame". In the specific embodiment being described, the interval between frames maybe arbitrarily set for routine surveillance such as at 40 seconds. Thus an image of the surface distortion is captured about every two feet along the emerging slab. The interval can be keyboard selectable anywhere from several minutes down to the minimum camera multiplexing cycle time. The latter depends on the particular details of computer processing speed and the details of the data reduction done by the particular algorithm selected. In the present configuration, it appears that 10 seconds is about the fastest capture of a total cross-section that can be repeated.

The contour images for all of the surfaces and the width and the offset for that frame can be shown on the computer monitor 39 each time the frame is taken. It continues to be displayed until the next frame is taken. All of the image data for each frame is stored on hard disk and later backed up on tape.

The distorted image displayed on terminal 39 is handled by the algorithm so that in the direction of the distortion of the displayed image is shown 1:1. That is if the gutter appears to be about ¼" deep on the image, it is ¼" deep on the slab. Thus operating personnel can view the distortion semiquantitatively on terminal 39 during the cast and note the association to other currently occurring operating parameters, e.g. water flows, casting speed etc. This can lead plant operating personnel to alter the control parameters of the continuous caster based upon real time knowledge of the slab being produced.

Figure 4:
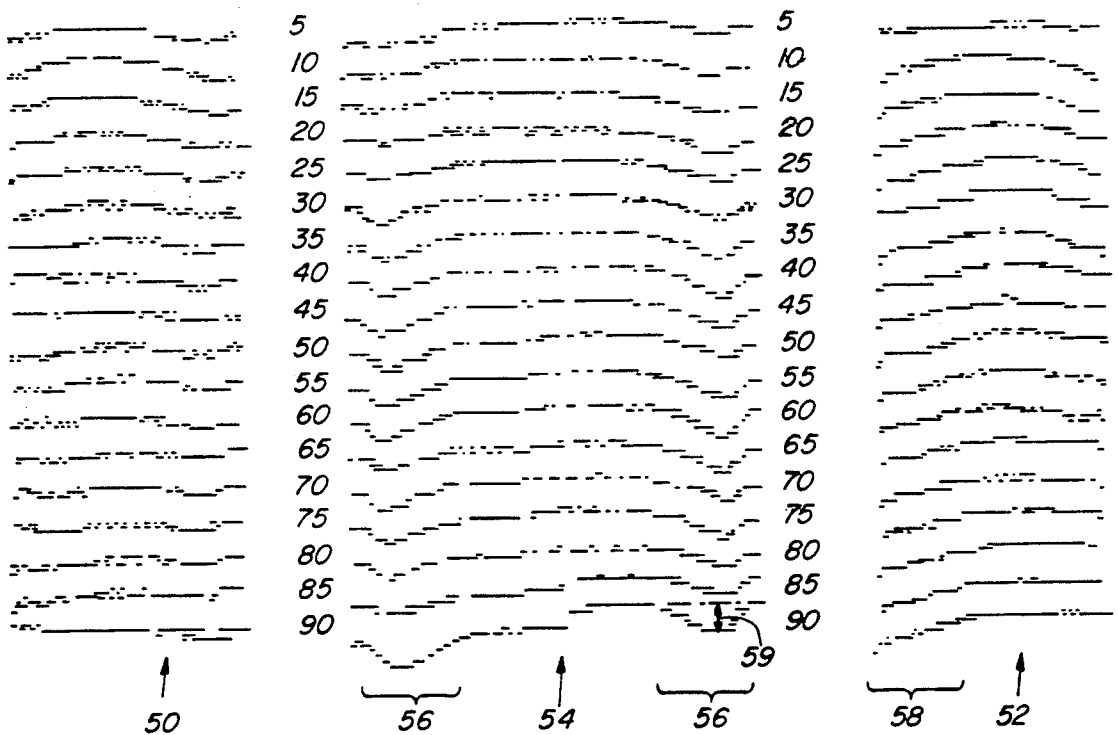
FIG. 4 is a typical hard-copy printout displaying contours of the top and opposite side edges taken throughout the length of an entire cast.

Illustrated in FIG. 4 is a typical hard copy printout of some of the cross-section images of an entire casting created by the present invention. The image for each frame is made up of two edge image profiles 50 and 52. The edge profiles are arranged horizontally at the ends of the corresponding one of the broad face surface profiles 54. Indicia between the displays 50 and 54 and displays 54 and 52 are the numbers of the frame being displayed. The numerical indicia correspond to increments of length along the length of the slab where profile images were taken. For clarity in the printout, shown in FIG. 4, only every fifth frame is shown. Reference numerals 56 denotes areas of the imaged profiles comprising guttering on the top surface of the slab and reference numeral 58 denotes areas of the imaged profiles comprising rounded filets on the top half of the edge of the slab. The images 50 along the other edge show that edge being essentially rectangular, i.e., straight lines, within the noise limit. When a rectangular box is set in the imaging location for calibration purposes the image segments are all straight lines. The printout is set up by the algorithm so that measurements of the distortion in the printed image reveal the actual dimensions of the distortion of the slab. To illustrate, gutter depth designated by reference numeral 59 on the top image of frame 90 can be measured with a ruler to be 3/16" which is the actual gutter depth measured directly on the slab. This 1:1 scaling factor also applies for the vertical dimension of the printout. As described, the distortion of both the wide surfaces and the edges can be quantitatively measured. When the bottom imaging units are implemented the vertical spacing between the frame images on the printout can be expanded to accommodate the inclusion of the slab bottom contour image just below the image of the top surface.

In FIG. 5 there is shown another typical printout where the computer algorithm has been used to automatically reduce the data to aid in understanding the dynamics of the continuous casting process. FIG. 5 contains information about the characteristics of the cast slab derived by the chosen algorithm from the details of the frames captured throughout the casting process. As mentioned above, a width is derived from the edge images 50 and 52 of FIG. 4 for each frame. These width values are plotted in FIG. 5. The mark referenced as 60 is the width derived for frame 5, i.e., the top one in FIG. 4. The mark below 60 would be for frame 10 etc. For clarity, only every fifth frame is shown in FIG. 5. Mark 60 and all those for the subsequent frames are plotted with respect to the DEVIATION FROM AVERAGE WIDTH scale 62 whose zero line is the grand average derived by the algorithm from the widths derived for each individual frame.

The mark referenced in FIG. 5 with numeral 63 is a plot of the transverse offset of the slab cross-section with respect to the machine center line 27 as derived from the location of the edge laser line images for frame 5. Offset reading 63 is plotted with respect to the OFFSET FROM CENTER LINE scale 64. ON scale 64 the zero line 65 represents the center line 27 of actual runout table 26. The displacement of a marker from that center line is the actual absolute distance of the slab cross-section was offset from the center line. On the printout of FIG. 5 scale 64 is arranged so that 1:1, i.e., whatever is measured on the printout is the actual offset of the slab at the point in time (distance along the emerging cast slab) that the frame was taken.

Also in FIG. 5, the line near the top of the page designated by reference numeral 66 contains a statistical summary about the width of the slab for the entire casting period. The printing in line 67 just below line 66 has the same statistics about the offset. To produce the data reduction comprised in the two lines 66 and 67 the algorithm uses the data from every frame taken during the entire casting period. The data printed above line 66 capture the date and time of the cast so that the shape, width and offset data generated by the invention described here can be related to information about the cast slab which is in other data files, e.g., what grade of steel, what speeds, water flows, etc. Thus definitive diagnosis and process analysis leading to an understanding of which parameters are critical to the minimization of distorted slab shape can be carried out supported by definitive shape information.

While the present invention has been described in connection with the preferred embodiment of the various figures, it is to be noted that other similar embodiments may be used or modifications and additions may be made to the described embodiment for performing the same functions of the present invention without deviating therefrom. Therefore, the present invention should not be limited to any single embodiment, but rather construed in breadth and scope in accordance with the recitation of the appended claims.

What I claim is:

1. A system for creating images of the contours of surfaces of a generally rectangular cross sectional shaped metallic workpiece while carried by a transport means, including:

monochromatic planar light emitting means for directing light at acute angles upon the opposite edge surfaces of the workpiece, which surfaces defined the width thereof;

image creating means for creating separate electrical signals corresponding to an image of light reflected from said surfaces of the workpiece;

means responsive to said electrical signals for producing profile data corresponding to the contours of the illuminated surfaces of the workpiece, and wherein said means responsive to said electrical signals include means for substantially simultaneously deriving from said image signals of the edges an offset signal corresponding to a deviation of the longitudinal center of the workpiece relative to said transport means, and a width signal corresponding to a width dimension of the workpiece.

2. The system according to claim 1 further including data recording means for recording said profile data.

3. The system according to claim 2 further including display means for displaying said images of the surfaces of the workpiece from said profile data.

4. The system of claim 3 wherein said display means includes a video terminal.

5. The system according to claim 3 wherein said display means includes a printer.

6. The system of claim 2 wherein said data recording means includes a computer containing a memory.

7. The system of claim 2 wherein said data recording means includes a computer having algorithm to form consecutive displays.

8. The system of claim 1 wherein said light emitting means includes a laser for each said opposite edge, said lasers including lens means for emitting sheets of monofrequency planar light.

9. The system of claim 1 wherein said image creating means include a separate image creating means for each said opposite edge, each said image creating means including a video camera.

10. The system according to claim 1 wherein said monochromatic light emitting means includes a plurality of lasers having lens for forming sheets of light and arranged to direct the sheets of light onto a plurality of surfaces of a workpiece.

11. The system according to claim 1 wherein said means for deriving includes an algorithm.

12. The system according to claim 1, said image creating means including means for creating an electrical signal corresponding to an image of light reflected from a surface of the workpiece extending between said opposite edge surfaces thereof, and
said means responsive to said electrical signals including means for producing profile data corresponding to the contour of the illuminated said extending surface.

13. The system according to claim 12, a separate said light emitting means for each said opposite edge surfaces and for said extending surface.

14. The system of claim 1, wherein said means for deriving a width signal includes means for producing an average width of the workpiece.

15. A method of determining the contours of edge surfaces of a generally rectangular cross sectional shaped metal slab while carried by a transport means, said surfaces defining the width dimension of the slab, including the steps of:
directing monochromatic planar light along an acute attack angle to illuminate the opposite edge surfaces of the metal slab for determining the off center and width conditions thereof;
generating separate electrical signals corresponding to images of the illuminated edge surfaces which images are derived at an angle different from said attack angle within a field of view including the illuminated part of the edge surfaces of the metal slab;
using said electrical signals to produce data corresponding to the contours of the illuminated edge surfaces of the metal slab, and wherein said step of using said electrical signals include substantially simultaneously deriving from said edge image signals of the slab an offset signal corresponding to a deviation of the longitudinal center of the slab relative to said transport means, and a width signal corresponding to a width dimension of the slab.

16. A method of claim 15 including the further step of modifying a control parameter used for forming said metal slab according to said data to alter the edge surface contours of a subsequently produced part of the metal slab for producing a slab having desired edge surface contours.

17. The method according to claim 15 including the further steps of recording said images, and displaying an image of the workpiece from the recorded image.

18. The method of claim 17 wherein said step of displaying includes using a video terminal.

19. The method according to claim 15 wherein said step of using said electrical signals include printing said data by a printer.

20. The method of claim 15 wherein said planar light is generated by a laser for each said opposite edge.

21. The method of claim 15 wherein said images are created by a video camera.

22. The method of claim 15 wherein said images comprises electrical signals recorded by a computer.

23. The method according to claim 15 wherein said step of forming said images includes using an algorithm.

24. The method according to claim 15 wherein said step of generating said electrical signals include generating electrical signals corresponding to said opposite edge surfaces of said metallic workpiece while moving along said transport means.

25. The method according to claim 15, including the further steps of said generating step including the step of creating an electrical signal corresponding to an image of light reflected from a surface of the slab extending between said opposite edge surfaces thereof, and
said step of using said electrical signals including the step of producing profile data corresponding to the contour of the illuminated said extending surface.

26. The method according to claim 25, including the further step of said directing step including separate illuminations of said opposite edge surfaces of the slab and the surface extending between said opposite edge surfaces.

27. A method of claim 15 including the further step of producing an average width dimension of the slab.

28. A system for creating images of the contours of surfaces of an object while carried by a transport means and for determining certain characteristics of the object from said images, including:
monochromatic planar light emitting means for directing light at acute angles upon the opposite edge surfaces of the object, which surfaces defined the width thereof;
image creating means for creating separate electrical signals corresponding to an image of light reflected from said surfaces of the object,
means responsive to said electrical signals for producing profile data corresponding to the contours of the illuminated surfaces of the object; and
wherein said means responsive to said electrical signals include means for deriving from said image signals of the edges an offset signal corresponding to a deviation of a data center of the object relative to said transport means.

29. A method of determining the contours of edge surfaces of an object, while carried by a transport means and for determining certain characteristics of the object from said images, said surfaces defining the width dimension of the object, including the steps of:
directing monochromatic planar light along an acute attack angle to illuminate the opposite edge surfaces of the object for determining the off center condition thereof;
generating separate electrical signals corresponding to images of the illuminated edge surfaces which images are derived at an angle different from said attack angle within a field of view including the illuminated part of the edge surfaces of the object;
using said electrical signals to produce data corresponding to the contours of the illuminated edge surfaces of the object, and wherein said step of using said electrical signals include deriving from said edge image signals of the object an offset signal corresponding to a deviation of the data center of the object image relative to said transport means.

* * * * *